(12) United States Patent
Kihara et al.

(10) Patent No.: US 11,361,091 B2
(45) Date of Patent: Jun. 14, 2022

(54) INFORMATION PROCESSING DEVICE, ACCESS CONTROL METHOD, SYSTEM, AND STORAGE MEDIUM

(71) Applicant: FUJITSU LIMITED, Kawasaki (JP)

(72) Inventors: Hideto Kihara, Kawasaki (JP); Junichi Yura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 199 days.

(21) Appl. No.: 16/197,336

(22) Filed: Nov. 20, 2018

(65) Prior Publication Data

US 2019/0188398 A1 Jun. 20, 2019

(30) Foreign Application Priority Data

Dec. 20, 2017 (JP) .............................. JP2017-243598

(51) Int. Cl.
*G06F 21/62* (2013.01)
*H04W 12/08* (2021.01)
*H04L 9/40* (2022.01)
*H04W 12/64* (2021.01)

(52) U.S. Cl.
CPC ........ *G06F 21/6209* (2013.01); *H04L 63/107* (2013.01); *H04W 12/08* (2013.01); *H04W 12/64* (2021.01); *G06F 2221/2111* (2013.01)

(58) Field of Classification Search
CPC ......... G06F 21/6209; G06F 2221/2111; G06F 2221/2137; G06F 21/30; G06F 21/6218; H04W 12/00503; H04W 12/08; H04W 12/63; H04L 63/107
See application file for complete search history.

(56) References Cited

U.S. PATENT DOCUMENTS

| 5,736,932 A | * | 4/1998 | Bulfer .................. H04L 63/104 340/5.74 |
| 10,579,322 B1 | * | 3/2020 | Rodrigues ............. G06F 3/1454 |
| 2008/0201783 A1 | | 8/2008 | Tamai |
| 2012/0198570 A1 | * | 8/2012 | Joa ...................... G06F 21/6218 726/30 |

(Continued)

FOREIGN PATENT DOCUMENTS

| JP | 2006-092170 | 4/2006 |
| JP | 2008-015669 | 1/2008 |

(Continued)

*Primary Examiner* — Jung W Kim
*Assistant Examiner* — Sangseok Park
(74) *Attorney, Agent, or Firm* — Fujitsu Patent Cetner

(57) ABSTRACT

An information processing device includes a memory; and a processor coupled to the memory and configured to identify a location where a user is present, when the user accesses a resource by using a remote desktop connection, set access authority of the user over the resource to an allowed state or a prohibited state in accordance with whether or not the location is within an allowed region in which access to the resource is allowed, when it is determined that the location is out of the allowed region while the user is accessing the resource by using the remote desktop connection, start measurement of time without setting the access authority of the user over the resource to a prohibited state, and when it is determined that a predetermined time has elapsed after the measurement is started, terminate the remote desktop connection.

10 Claims, 17 Drawing Sheets

(56) References Cited

U.S. PATENT DOCUMENTS

| | | | |
|---|---|---|---|
| 2014/0259047 A1* | 9/2014 | Bakar | H04W 4/023 |
| | | | 725/30 |
| 2014/0282893 A1* | 9/2014 | Sheller | H04L 63/08 |
| | | | 726/4 |
| 2016/0066189 A1* | 3/2016 | Mahaffey | H04M 15/7652 |
| | | | 455/405 |
| 2016/0070510 A1* | 3/2016 | Iwase | G06F 3/1238 |
| | | | 358/1.14 |
| 2017/0289806 A1* | 10/2017 | Girdhar | H04L 67/12 |
| 2018/0285544 A1* | 10/2018 | Chang | G06F 21/32 |
| 2019/0037357 A1* | 1/2019 | Bijor | H04L 67/22 |

FOREIGN PATENT DOCUMENTS

| | | |
|---|---|---|
| JP | 2008-160803 | 7/2008 |
| JP | 2008-204070 | 9/2008 |
| JP | 2008-250627 | 10/2008 |

\* cited by examiner

FIG. 5

| USER ID | TERMINAL ID |
|---------|-------------|
| taro    | 381957      |
| ...     | ...         |
| ...     | ...         |

| AREA | FILE | APPLICATION IN USE |
|---|---|---|
| LOCATION 1 | fileA.xls | Excel |
| ... | ... | ... |
| ... | ... | ... |

| AREA | RESOURCE PATH |
|---|---|
| SITE 1 | ¥¥fileserv¥place1 |
| SITE 2 | ¥¥fileserv¥place2 |
| ... | ... |

| AREA | TERMINATION SUSPENSION TIME |
|---|---|
| SITE 1 | 5 MINUTES |
| SITE 2 | 10 MINUTES |
| ... | ... |

| AREA | DISTANCE FROM AREA | PROBABILITY |
|---|---|---|
| SITE 1 | 0 | 1 |
| SITE 2 | 12 | 0.1 |
| ... | ... | ... |

126

INFORMATION PROCESSING DEVICE, ACCESS CONTROL METHOD, SYSTEM, AND STORAGE MEDIUM

CROSS-REFERENCE TO RELATED APPLICATION

This application is based upon and claims the benefit of priority of the prior Japanese Patent Application No. 2017-243598, filed on Dec. 20, 2017, the entire contents of which are incorporated herein by reference.

FIELD

The embodiments discussed herein are related to an information processing device, an access control method, a system, and a storage medium.

BACKGROUND

In recent years, an information-sharing technology referred to as remote desktop, in which the resources of a computer are controlled remotely from another computer connected thereto, has been widely used. A system for implementing remote desktop may be referred to as a virtual desktop infrastructure (VDI) system. A connection to another computer through remote desktop may be referred to as a remote desktop connection.

As a related technology, there is a technology that detects the location of a user, and to improve resource security, authenticates a user's action on the resource based on the detected user's location and authority over a set resource in accordance with the user's location. Further, an electronic data access control system that may be accessed by allowed persons only and at allowed locations only is disclosed. Examples of the related arts are Japanese Laid-open Patent Publication No. 2006-92170, Japanese Laid-open Patent Publication No. 2008-015669, and Japanese Laid-open Patent Publication No. 2008-160803, for example.

For example, when using a resource which is allowed to be accessed in a first area by using a remote desktop connection, the user may temporarily move from the first area to a second area. According to the related technology described above, the remote desktop connection session is terminated to disable access to the currently used resource. Thus, when returning to the first area, the user has to perform reconnection of remote desktop. This operation may not be efficient for remote desktop connection users. In view of the above, it is desirable to restrict resource use in accordance with location without impairing usability of a remote desktop connection.

SUMMARY

According to an aspect of the embodiments, an information processing device includes a memory; and a processor coupled to the memory and configured to identify a location where a user is present, when the user accesses a resource by using a remote desktop connection, set access authority of the user over the resource to an allowed state or a prohibited state in accordance with whether or not the location is within an allowed region in which access to the resource is allowed, when it is determined that the location is out of the allowed region while the user is accessing the resource by using the remote desktop connection, start measurement of time without setting the access authority of the user over the resource to a prohibited state, and when it is determined that a predetermined time has elapsed after the measurement is started, terminate the remote desktop connection.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a user information DB;

FIG. 6 is a diagram illustrating an example of a resource-in-use DB;

FIG. 7 is a diagram illustrating an example of a resource DB;

FIG. 9 is a diagram illustrating an example of a termination suspension time DB;

FIG. 16 is a diagram illustrating an example of a distance and probability DB.

DESCRIPTION OF EMBODIMENTS

Embodiments of the disclosure will be specifically described below with reference to FIG. 1 to FIG. 17.

First Embodiment

A first embodiment will be described below with reference to FIG. 1 to FIG. 11.

Figure 1:
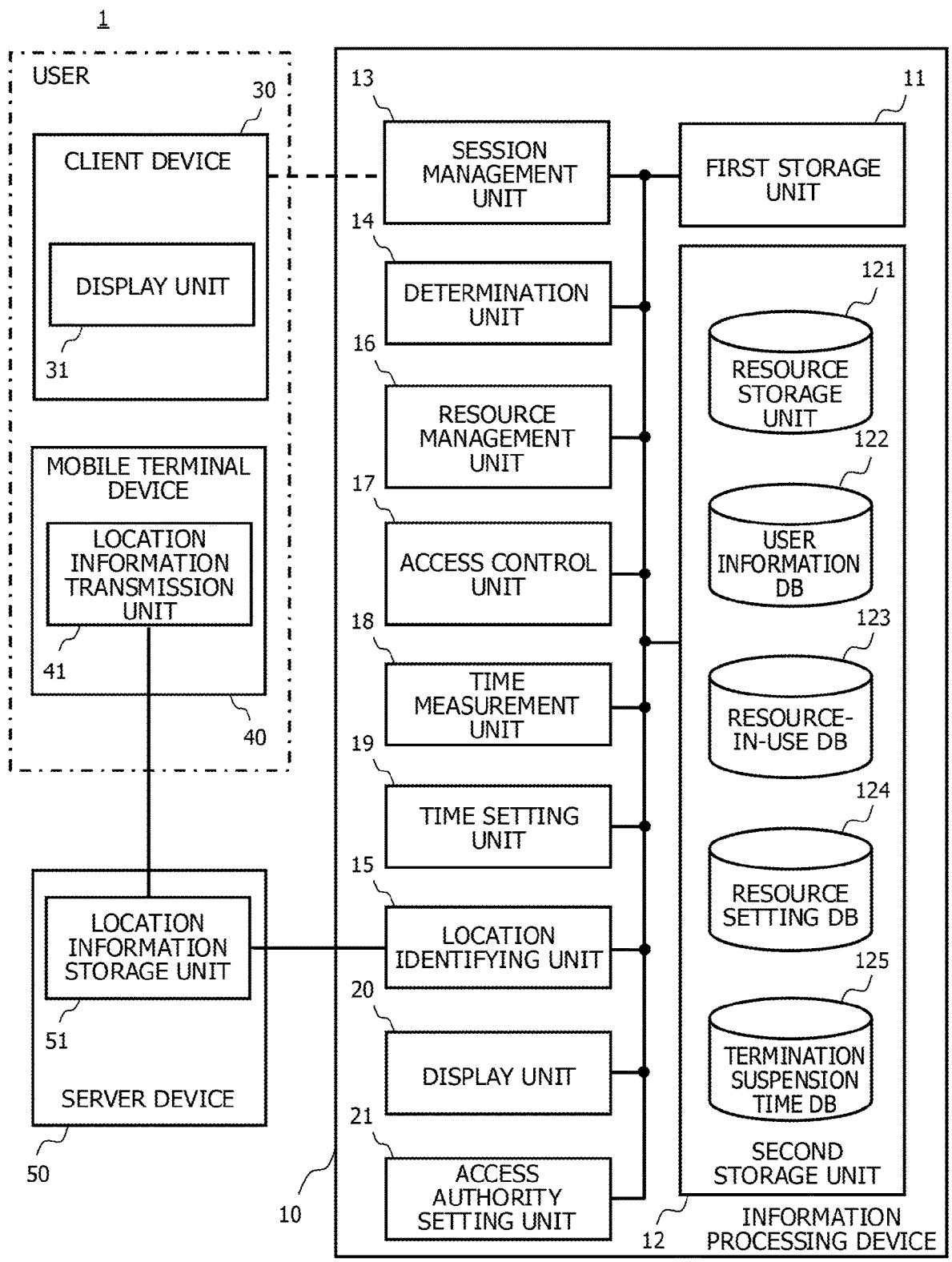
FIG. 1 is a diagram illustrating an example of a system according to a first embodiment.

FIG. 1 is a diagram illustrating an example of a system according to the first embodiment. As illustrated in FIG. 1, a system 1 includes an information processing device 10, a client device 30, a mobile terminal device 40, and a server device 50. The information processing device 10 may mutually communicate with the client device 30 and the server device 50 via a network. The mobile terminal device 40 may wirelessly communicate with the server device 50. The one-dot-chain line illustrated in FIG. 1 indicates a user region. The user is movable while carrying the client device 30 and the mobile terminal device 40.

The information processing device 10 is a computer that is remotely operated by using a remote desktop from the client device 30. When the client device 30 accesses a file held by the information processing device 10 during remote operation, the information processing device 10 performs a process of controlling access.

The client device 30 is a computer that performs remote operation by using a remote desktop on the information processing device 10. The display unit 31 may display a termination alert for a remote desktop connection received from the information processing device 10. The display unit 31 is a display device such as a display, for example.

The mobile terminal device 40 is a portable computer carried by the user and has a location information transmission unit 41. The location information transmission unit 41 periodically transmits location information on the mobile terminal device 40 to the server device 50. This enables the server device 50 to periodically acquire location information on the user. The mobile terminal device 50 is a smartphone or a tablet, for example.

The server device 50 is a computer that provides a data storage service as a cloud service and has a location information storage unit 51. The server device 50 is installed in a datacenter, for example. The server device 50 periodically receives location information on the mobile terminal device 40 from the mobile terminal device 40 and stores the received location information and a terminal identifier (ID), which is an identifier used for identifying the mobile terminal device 40, in association with each other in the location information storage unit 51. In response to receiving a transmission request, the server device 50 reads location information from the location information storage unit 51 and provides the read location information to the source of the transmission request. The location information storage unit 51 is a storage device such as a hard disk drive (HDD) or a semiconductor memory, for example. The location information received from the mobile terminal device 40 may include information on the time the location is identified.

Next, function blocks of the information processing device 10 will be described. As illustrated in FIG. 1, the information processing device 10 includes a first storage unit 11, a second storage unit 12, a session management unit 13, a determination unit 14, a location identifying unit 15, a resource monitoring unit 16, an access control unit 17, a time measurement unit 18, a time setting unit 19, a display unit 20, and an access authority setting unit 21. Functions of respective units will be described below.

The first storage unit 11 stores a program executed by the information processing device 10.

The second storage unit 12 stores information used in a process performed by the information processing device 10. The second storage unit 12 contains a resource storage unit 121, a user information database (DB) 122, a resource-in-use DB 123, a resource setting DB 124, and a termination suspension time DB 125, for example. A resource may be a file, an application, a device, or the like, for example. The resource storage unit 121, the user information DB 122, the resource-in-use DB 123, the resource setting DB 124, and the termination suspension time DB 125 will be described later in detail.

The session management unit 13 is a processing unit on the information processing device 10 side used for a remote desktop connection. The session management unit 13 performs processes of establishing or terminating a remote desktop connection session with the client device 30. Hereinafter, establishment or termination of a remoted desktop connection session may be referred to as establishment or termination of remoted desktop connection.

The determination unit 14 executes various determination processes performed by the information processing device 10.

The location identifying unit 15 identifies a location where the user is present. The location identifying unit 15 identifies a building, a structure, or an area of a building such as a school, a public, a hospital, or the like, for example. The location identifying unit 15 may also identify a combination of a location where the user is present and information on the time when the location is identified.

The resource monitoring unit 16 refers to the resource-in-use DB 123 and monitors whether or not the user is using an out-of-area resource. The term "out-of-area resource" as used herein refers to a resource which is allowed to be accessed in a predetermined area that is different from the area in which the user is present. The out-of-area resource may be a file, an application, a device, or the like, for example. Hereinafter, description will be provided assuming that the out-of-area resource is a file and that access authority for each area is specified for the file. Hereinafter, an area in which access to a resource or a file is allowed may be referred to as an "allowed region".

The access control unit 17 determines an access control scheme considered with the user for a resource stored in the resource storage unit 121 in accordance with a result of a process performed by the information processing device 10.

The time measurement unit 18 activates a termination suspension timer to measure the elapsed time from the activation. The termination suspension timer is a timer that measures elapsed time to determine whether or not the termination suspension time, which is the time until termination of the remote desktop connection described above, has elapsed. While the user is accessing a resource by using a remote desktop connection, when it is determined by the determination unit 14 that the location where the user is present is out of an allowed region, the time measurement unit 18 starts measurement of time in a state where the access authority setting unit 21 does not set access authority of the user over the resource to a prohibited state. The process using the termination suspension timer will be described later in detail.

The time setting unit 19 sets the termination suspension time before the remote desktop connection is terminated. The termination suspension time will be described later in detail.

The display unit 20 displays a termination alert to warn the user of termination of the remote desktop connection.

When the user uses a remote desktop connection to access a resource, the access authority setting unit 21 sets access authority of the user over the resource to an allowed state or a prohibited state in accordance with whether or not the location where the user is present is within an allowed region. The access authority is set via an application programming interface (API) of an operating system (OS), for example. A result of the process described above may be a location where the user is present or a combination of a location where the user is present and the time when the location is identified, for example. According to the latter example, it is possible to set the access authority by using the location of the user and the time as parameters so as to set the access authority to allow access in a company building during working hours only, for example.

Next, the hardware configuration of the information processing device 10 will be described.

Figure 2:
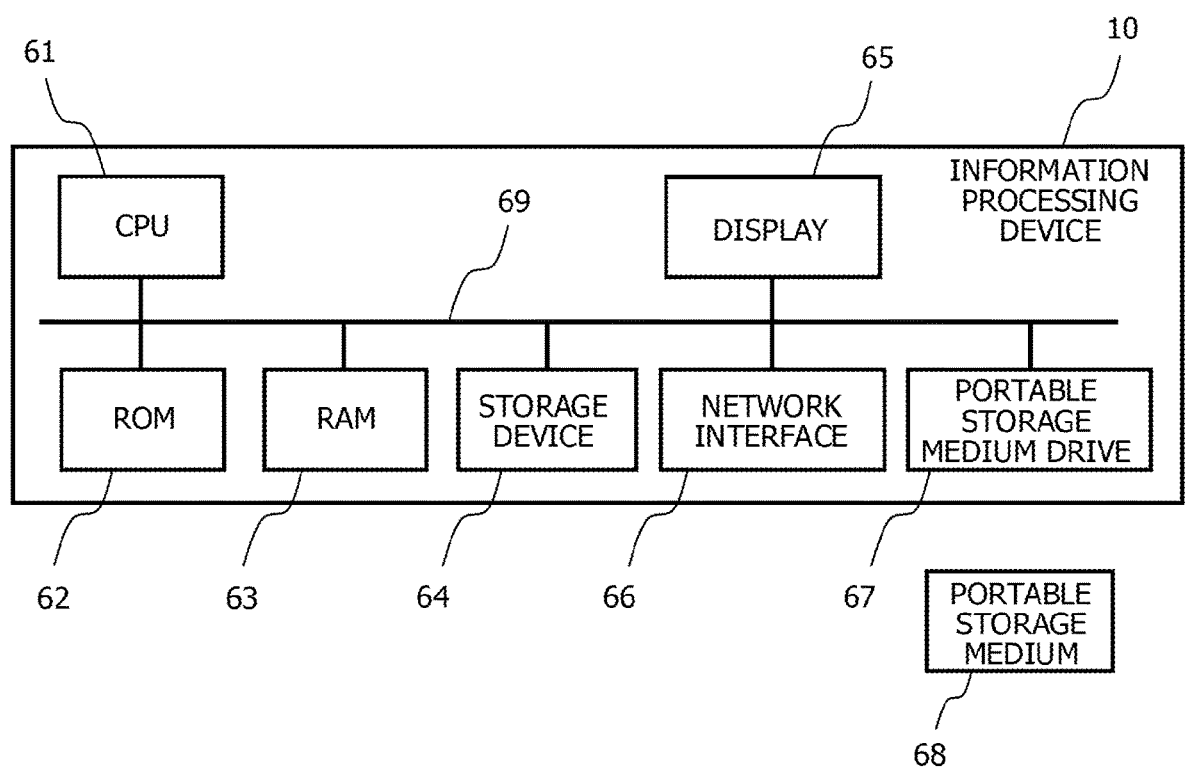
FIG. 2 is a diagram illustrating an example a hardware configuration of an information processing device according to the first embodiment.

FIG. 2 is a diagram illustrating an example of the hardware configuration of the information processing device 10 according to the first embodiment. As illustrated in FIG. 2, the information processing device 10 includes a central processing unit (CPU) 61, a read-only memory (ROM) 62, a random access memory (RAM) 63, a storage device 64, a display 65, a network interface 66, and a portable storage medium drive 67.

The CPU 61 is a hardware device that manages or performs the process of the information processing device 10 and is an example of a processor. As a processor, other processing circuits such as a microprocessing unit (MPU) or a digital signal processor (DSP) may be used. The session management unit 13, the determination unit 14, the location identifying unit 15, the resource monitoring unit 16, the access control unit 17, the time measurement unit 18, the time setting unit 19, and the access authority setting unit 21 illustrated in FIG. 1 may be implemented by the CPU 61, for example.

The ROM 62, the RAM 63, and the storage device 64 are each a hardware device that stores data and a program used in the process executed by the CPU 61. The storage device 64 may be a hard disk drive (HDD), for example. The first storage unit 11 illustrated in FIG. 1 may be implemented by the ROM 62 and the storage device 64, for example. The second storage unit 12 illustrated in FIG. 1 may be implemented by the RAM 63 and the storage device 64, for example.

The display 65 is a device that displays a static image or a video (moving image). The display 65 may have a function of outputting audio. The display 65 may be a liquid crystal display, a plasma display, or an organic electro luminescence (EL) display, for example. The display 65 is an example of the display unit 20 illustrated in FIG. 1.

The network interface 66 is a hardware device used for communicating with other devices via a network. The session management unit 13 and the location identifying unit 15 illustrated in FIG. 1 may be implemented by the network interface 66, for example.

Respective components of the information processing device 10 are connected to a bus 69 so as to be able to exchange data with each other via the bus 69. In the information processing device 10, a processor such as the CPU 61 executes a program stored in the ROM 62 or the storage device 64 or a program read from a portable storage medium 68 by the portable storage medium drive 67, and thereby the function of the information processing device 10 is implemented. Such a program may be loaded into the RAM 63 and executed by a processor such as the CPU 61.

Next, an access control method performed by the information processing device 10 illustrated in FIG. 1 according to the first embodiment will be described.

Figure 3:
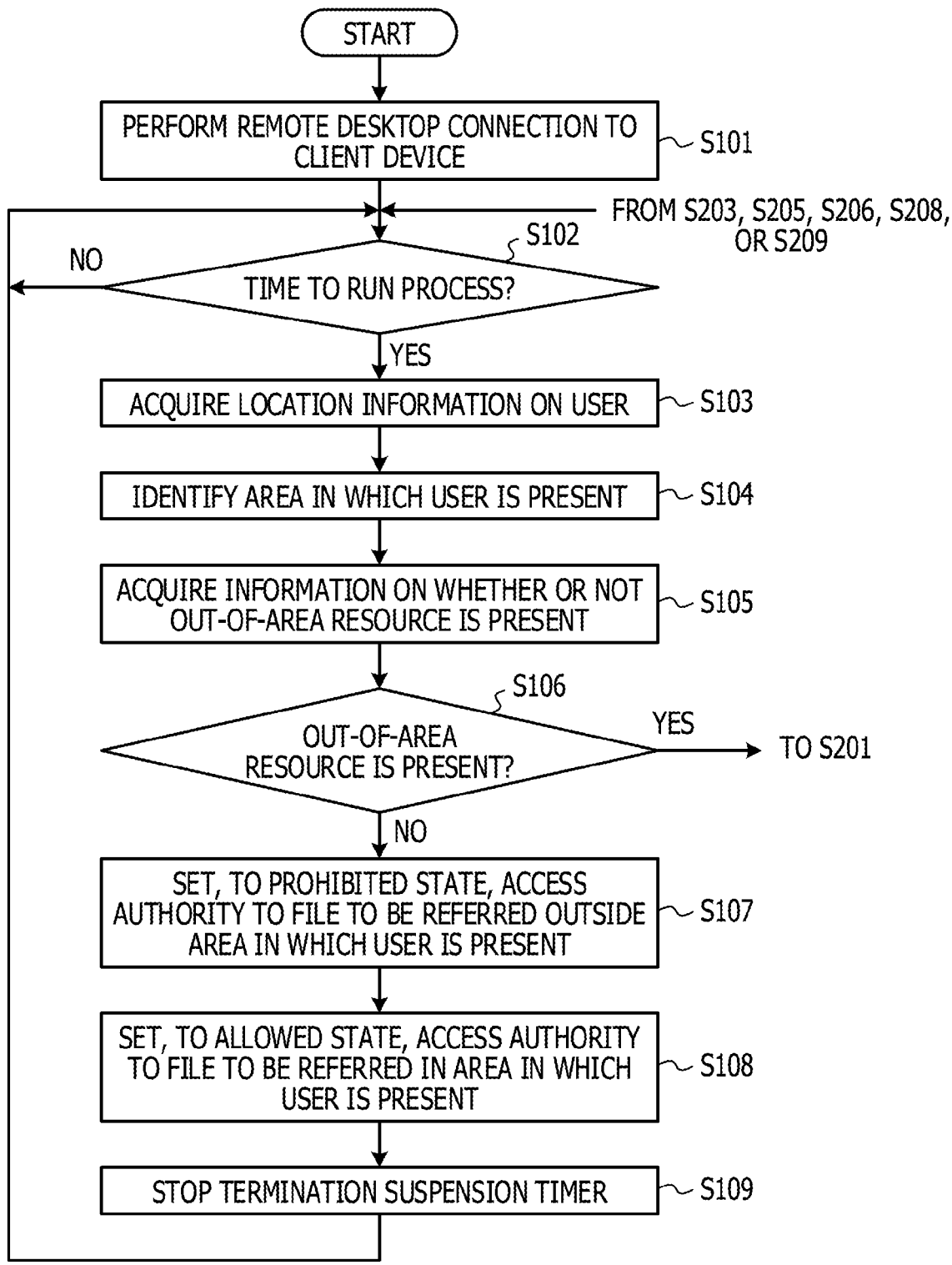
FIG. 3 is a flowchart (part 1) illustrating an example of a process performed by the information processing device according to the first embodiment.

FIG. 3 is a flowchart (part 1) illustrating an example of a process performed by the information processing device 10 according to the first embodiment. First, the client device 30 transmits a request for a remote desktop connection to the information processing device 10. In response to the request received from the information processing device 10, the session management unit 13 of the information processing device 10 establishes a remote desktop connection to the client device 30 (S101). Upon establishment of the remote desktop connection, the information processing device 10 may acquire information on a user ID, which is an identifier that identifies the user of the client device 30.

Subsequently, the determination unit 14 determines whether or not it is time to run a process of controlling access authority of the user over a resource stored in the resource storage unit 121 (S102). The process of controlling access authority is periodically run at predetermined time intervals after the remote desktop connection is started. Thus, if it is determined not to be the time to run the process (S102: No), the process of step S102 is re-performed. On the other hand, if it is determined to be the time to run the process (S102: Yes), the location identifying unit 15 acquires location information on the user (S103). As described above, the server device 50 periodically receives location information on the mobile terminal device 40 from the mobile terminal device 40 and stores the received location information and the terminal ID in association with each other in the location information storage unit 51. The process of step S103 will be described later in detail.

Figure 4:
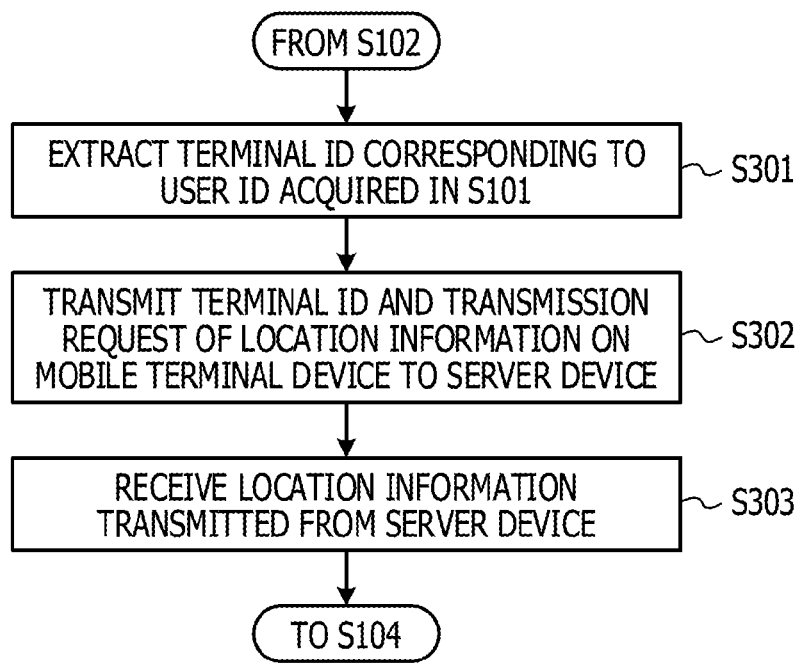
FIG. 4 is a flowchart illustrating an example of a process of acquiring location information on a user in step S103.

FIG. 4 is a flowchart illustrating an example of a process of acquiring location information on the user in step S103.

First, the location identifying unit 15 refers to the user information DB 122 and extracts the terminal ID corresponding to the user ID acquired in step S101 (S301). The user information DB 122 is now described.

Figure 5:
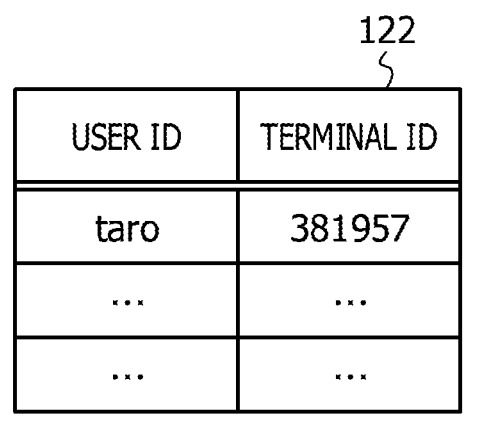

FIG. 5 is a diagram illustrating an example of the user information DB 122. As illustrated in FIG. 5, the user information DB 122 has fields of user ID and terminal ID. In the example of FIG. 5, "taro" is stored as the user ID, and "381957" is stored as the terminal ID associated with "taro". In step S301, when the user ID acquired in step S101 is "taro", the location identifying unit 15 extracts "381957" as the terminal ID.

Turning back to FIG. 4, after the process of step S301, the location identifying unit 15 transmits a transmission request for location information on the mobile terminal device 40 with the terminal ID information to the server device 50 (S302). The server device 50 receives the transmission request from the information processing device 10 and, in response to the received transmission request, transmits location information associated with the terminal ID of the mobile terminal device 40 to the information processing device 10.

Subsequently, the location identifying unit 15 receives the location information transmitted from the server device 50 (S303). This enables the location identifying unit 15 to acquire location information on the user carrying the mobile terminal device 40.

Turning back to FIG. 3, after the process of step S103, the location identifying unit 15 identifies an area in which the user is present (S104). In step S104, the location identifying unit 15 refers to area information (not illustrated) in which an area and a coordinate range are associated with each other and thereby identifies an area corresponding to the location information received in step S103 out of a plurality of areas stored in the area information. This enables the location identifying unit 15 to identify the area in which the user is present.

Subsequently, the resource monitoring unit 16 refers to the resource-in-use DB 123 and thereby acquires information on whether or not an out-of-area resource is present (S105). The resource-in-use DB 123 is now described.

FIG. 6 is a diagram illustrating an example of the resource-in-use DB 123. As illustrated in FIG. 6, resource-in-use DB 123 has fields of area, file, and application in use. Information indicating an area is stored in the area field. Information indicating a file being accessed in the area in interest is stored in the file field. Information indicating an application which is being used for opening the file in interest is stored in the application in use field. In the example of FIG. 6, "fileA.xls" as a file and "Excel" as an application in use are stored in association with the area of "LOCATION 1". In step S104, when an area different from the area in which the user is present is stored in the resource-in-use DB 123, the resource monitoring unit 16 acquires information to the effect that an out-of-area resource is present. On the other hand, when an area different from the area in which the user is present is not stored in the resource-in-use DB 123, the resource monitoring unit 16 acquires information to the effect that no out-of-area resource is present.

Next, an update process of the resource-in-use DB 123 will be described. The resource setting DB 124 is used in the update process of the resource-in-use DB 123.

FIG. 7 is a diagram illustrating an example of the resource setting DB 124. As illustrated in FIG. 7, the resource setting DB 124 has fields of area and resource path. In the field of area, information indicating an allowed region is stored. Information indicating a place where a file is stored in the field of resource path. The example of FIG. 7 indicates that a file that is allowed to be accessed in "site 1", which is an allowed region, is stored in a "place 1" folder, which is a folder corresponding to a file path component immediately following the server name identified by "fileserv".

In response to detecting that a file is accessed (a file is opened), the resource monitoring unit 16 identifies a used application from the extension of the file. For example, when the accessed file is "fileA.xls", the resource monitoring unit 16 identifies "Excel" as a used application based on the extension ".xls". Furthermore, the resource monitoring unit 16 refers to the resource setting DB 124 and identifies an area corresponding to a folder in which the opened file is stored. In the example of FIG. 7, when the folder in which the opened file is stored is "place 1", the resource monitoring unit 16 identifies "site 1" as the area. The resource monitoring unit 16 then stores the identified area, the accessed file, and the identified application in association with each other in the resource-in-use DB 123. In such a way, the update process of the resource-in-use DB 123 is performed.

Turning back to FIG. 3, after the process of step S105, the determination unit 14 determines whether or not an out-of-area resource is present in accordance with information on whether or not an out-of-area resource is present acquired in step S105 (S106). If it is determined that an out-of-area resource is present (S106: Yes), the process proceeds to step S201 of FIG. 8. On the other hand, if it is determined that no out-of-area resource is present (S106: No), the access authority setting unit 21 sets, to a prohibited state, access authority of a file to be referred to outside the area in which the user is present (S107).

Subsequently, the access authority setting unit 21 sets, to an allowed state, the access authority of a file to be referred to in the area in which the user is present (S108).

Subsequently, when the termination suspension timer is activated, the time measurement unit 18 stops the termination suspension timer (S109). After the process of step S109, the process returns to step S102 and re-performs the process from step S102. In such a way, when it is determined that no out-of-area resource is present, the user is able to continue to use the remote desktop.

Figure 8:
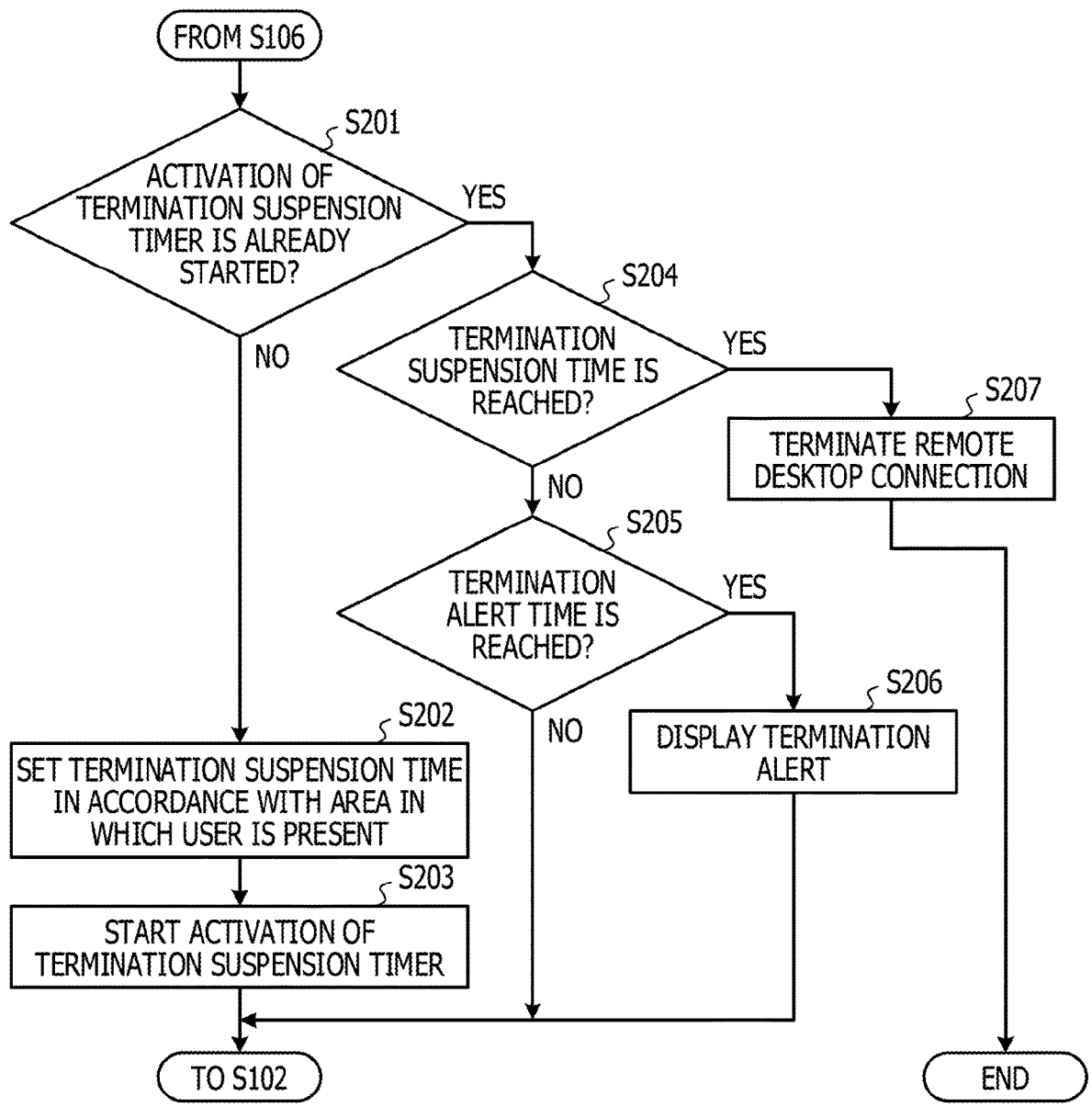
FIG. 8 is a flowchart (part 2) illustrating an example of a process performed by the information processing device according to the first embodiment.

FIG. 8 is a flowchart (part 2) illustrating an example of a process performed by the information processing device 10 in the first embodiment.

If it is determined in step S106 illustrated in FIG. 3 that an out-of-area resource is present (S106: Yes), the determination unit 14 determines whether or not activation of the termination suspension timer is already started (S201). If it is determined that activation of the termination suspension timer is not yet started (S201: No), the time setting unit 19 sets the termination suspension time in accordance with the area in which the user is present (S202). When the termination suspension time is set, the termination suspension time DB 125 is used. The termination suspension time DB 125 is now described.

FIG. 9 is a diagram illustrating an example of the termination suspension time DB 125. As illustrated in FIG. 9, the termination suspension time DB 125 has fields of area and termination suspension time. The area is information illustrating the area in which the user is present. The termination suspension time is information indicating a setting value of a suspended time period from the time when the termination suspension timer starts measuring time to the time when a remote desktop connection is terminated. In the example of FIG. 9, the setting value of the termination suspension time when the user is present in "site 1" is 5 minutes, and the setting value of the termination suspension time when the user is present in "site 2" is 10 minutes.

Turning back to FIG. 8, after the process of step S202, the time measurement unit 18 starts activating the termination suspension timer to start measuring time (S203). After the process of step S203, the process returns to step S102 of FIG. 3 and re-performs the process from step S102. Then, if it is determined in step S106 that no out-of-area resource is present (S106: No), this indicates that the user has closed the file of the out-of-area resource. In this case, since the termination suspension timer is stopped in step S108, the user is able to avoid termination of a remote desktop connection and continue to use the remote desktop.

On the other hand, in step S201, if it is determined that activation of the termination suspension timer is already started (S201: Yes), the determination unit 14 determines whether or not the elapsed time measured by the termination suspension timer reaches the termination suspension time (S204). If it is not determined that the elapsed time reaches the termination suspension time (S204: No), the determination unit 14 determines whether or not the elapsed time measured by the termination suspension timer reaches a predetermined termination alert time (S205). The termination alert time is the elapsed time until the time when the client device 30 is notified of the termination alert of a remote desktop connection. For example, the termination alert time may be the elapsed time until the time when remaining time of the termination suspension time is 20 seconds. For example, when the termination suspension time is set to 5 minutes, the termination alert time is set to 4 minutes 40 seconds.

In step S205, if it is determined that the elapsed time does not reach the termination alert time (S205: No), the process returns to step S102 and re-performs the process from step S102. On the other hand, if it is determined that the elapsed time reaches the termination alert time (S205: Yes), the session management unit 13 causes the display unit 31 of the client device 30 to display the termination alert (S206).

Figure 10:
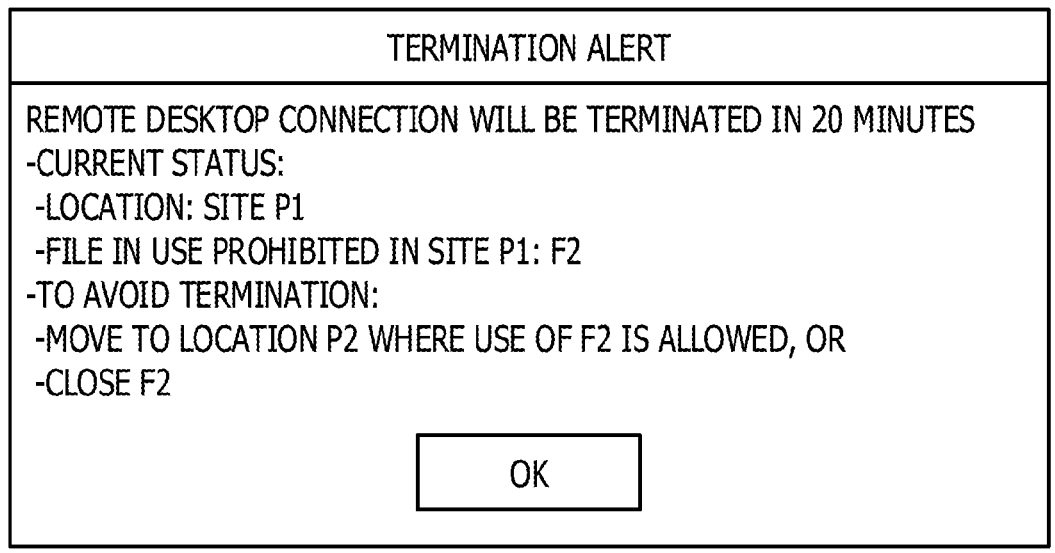
FIG. 10 is a diagram illustrating an example of a termination alert according to the first embodiment.

FIG. 10 is a diagram illustrating an example of a termination alert in the first embodiment. In the example of FIG. 10, the termination alert includes a message of "Remote desktop connection will be terminated in 20 seconds", and "Current status" and "To avoid termination" are indicated in addition to the message. The field "Current status" indicates the current location of the user and a name of a file used by the user which is prohibited at the current location. In the example of FIG. 10, "site P1" is indicated as the current location, and "F2" is indicated as a filename. The field "To avoid termination" indicates how to avoid termination of a remote desktop connection in accordance with the file used by the user. In the example of FIG. 10, "Move to location P2 where F2 is allowed to use and "Close F2" are indicated as the way to avoid termination.

Figure 11:
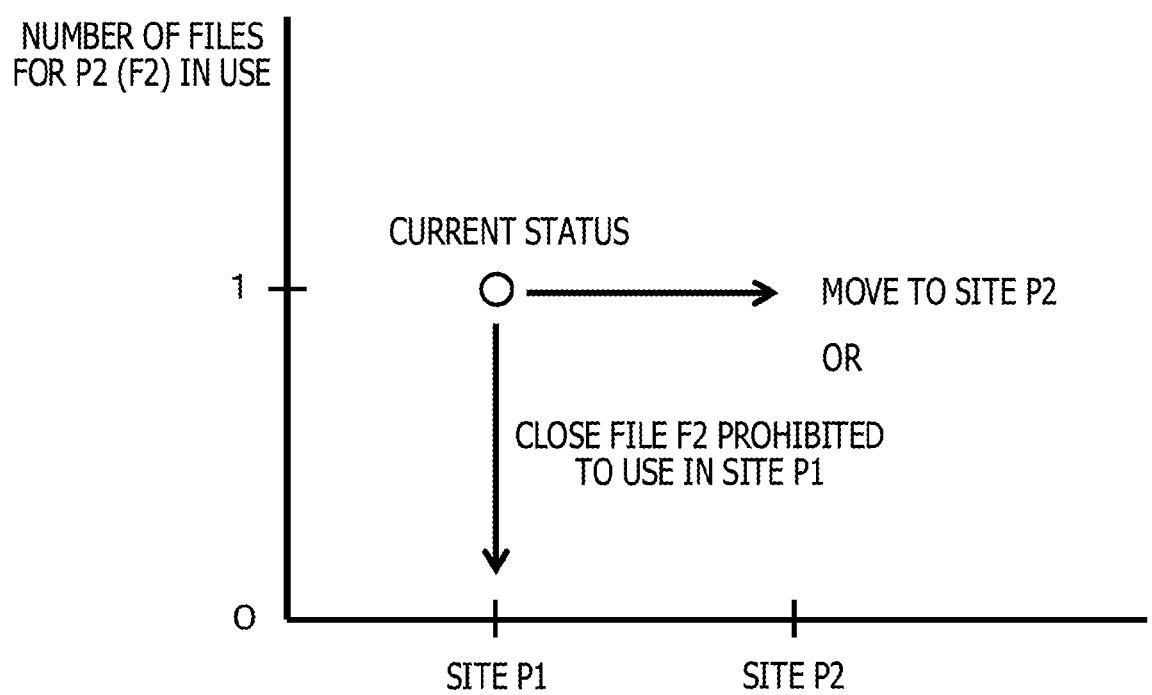
FIG. 11 is a diagram illustrating an example of a method of avoiding termination of a remote desktop connection.

FIG. 11 is a diagram illustrating an example of the way to avoid termination of a remote desktop connection. In FIG. 11, the vertical axis indicates the number of files for P2 in use that are allowed to be used in the site P2, which is specifically the number of files F2 in use. The horizontal axis indicates an area.

As illustrated in FIG. 11, let us assume a state where the user is in the site P1 and the user opens a single file F2 that is prohibited to use in the site P1. In such a state, in order to avoid termination of a remote desktop connection, the user may move to the location P2 where access to the file F2 is allowed or may close the opened file F2 and stop using files prohibited in the site P1. The user may select any of the above within a predetermined time in accordance with the status when receiving a termination alert.

As discussed above, before a remote desktop connection is terminated, it is possible to call the user's attention and reduce the frequency of termination by causing the display unit 31 of the client device 30 to display a termination alert. This may reduce processing load of the session management unit 13.

Turning back to FIG. 8, after the process of step S206, the process returns to step S102 and re-performs the process from step S102.

On the other hand, if it is determined that the elapsed time reaches the termination suspension time in step S204 (S204: Yes), the access control unit 17 causes the session management unit 13 to terminate a remote desktop connection (S207). In step S207, the session management unit 13 terminates a remote desktop connection to the client device 30 in accordance with an instruction from the access control unit 17. In such a way, when it is determined that an out-of-area resource is present, the user may continue to use remote desktop under a restricted situation.

As described above, the process performed by the information processing device 10 is implemented.

After a remote desktop connection is terminated, the user enters a user ID and a password in the client device 30 when establishing reconnection in the terminated area. In response to establishment of reconnection, the screen displayed before the termination is again displayed. At this time, a file opened or an application used before the remote desktop connection is terminated is maintained in the state that occurred before the termination. Note that, with establishment of reconnection, it is determined by the information processing device 10 in step S105 that the out-of-area resource is again used, and thus activation of the termination suspension timer is started in step S203.

According to the first embodiment, when the location where the user is present is identified and the user uses a remote desktop connection to access a resource, the access authority of the user over the resource is set to an allowed state or a prohibited state in accordance with whether or not the identified location is within an allowed region where access to the resource is allowed. While the user is accessing the resource by using a remote desktop connection, when it is determined that the identified location is out of the allowed region, measurement of time is started without the access authority of the user over the resource being set to a prohibited state. Then, when it is determined that a predetermined time has elapsed after the start of measurement, a remote desktop connection is terminated. This scheme may be implemented without involving change of an existing VDI system. According to this method, for example, when the user is accessing a resource which is allowed to be accessed in the first area by using a remote desktop connection and even when the user moves from the first area to the second area, the remote desktop connection is not terminated as long as the user moves back to the first area within a predetermined suspension time. By setting and operating the suspension time for each area, it is possible to suitably restrict a use of an area-based remote desktop connection. Furthermore, when it is determined that an out-of-area resource is present, the access control unit 17 does not set, to a prohibited state, the access authority to the file to be referred outside the area in which the user is present. Thereby, the user may ensure to have the time for saving an opened file under edition even when moving from the first area to the second area. As described above, according to the first embodiment, it is possible to restrict resource use in accordance with location without impairing usability of a remote desktop connection.

First Modified Example of First Embodiment

Next, a first modified example of the first embodiment will be described.

In the first embodiment, the user is able to continue to access an out-of-area resource by establishing reconnection even when a remote desktop connection is terminated. According to this scheme, by repeating termination and reconnection of a remote desktop connection, it is possible to continue to use an out-of-area resource. Thus, a use of out-of-area resource is not fully prohibited.

Accordingly, as the first modified example of the first embodiment, the access control unit 17 may count the number of times of reconnection and control reconnection to be disabled when the number of times of reconnection reaches an upper limit value. According to this scheme, since the number of times for the use of an out-of-area resource is limited, this may limit the time period during which the out-of-area resource may be used in an area in which access is not allowed.

Alternatively, the time setting unit 19 may set the termination suspension time to be shorter for a larger number of times of reconnection. According to this scheme, a larger number of times of reconnection results in a shorter time during which an out-of-area resource may be used, which may limit the time during which the out-of-area resource may be used in an area in which access is not allowed.

Alternatively, the time setting unit 19 may set the termination suspension time in accordance with the elapsed time from termination to reconnection of a remote desktop connection. For example, a shorter termination suspension time may be set for a shorter elapsed time described above. The user who intends to repeat termination and reconnection of a remote desktop connection tends to establish reconnection within a shorter time. Thus, the use of this scheme may suitably limit a use of an out-of-area resource by the user.

Second Modified Example of First Embodiment

Next, a second modified example of the first embodiment will be described.

While the example where the user accesses a single out-of-area resource has been described in the first embodiment, there may be a situation where a plurality of out-of-area resources are accessed and used at the same time.

Accordingly, as the second modified example of the first embodiment, the time setting unit 19 may dynamically change the setting of the termination suspension time in accordance with the number of out-of-area resources which are used at the same time by using a remote desktop connection. For example, in a situation where two out-of-area resources are used at the same time by using a remote desktop connection and when the use of one of the out-of-area resource is stopped, the time setting unit 19 may change the setting such that the termination suspension time associated with the other out-of-area resource is increased. Further, in a situation where a single out-of-area resource is present by using a remote desktop connection and when the use of a second out-of-area resource is started, the time setting unit 19 may change the setting such that the termination suspension time associated with the other out-of-area resource is shortened. According to this scheme, it is possible to limit the time during which a plurality of out-of-area resources are used at the same time in an area in which access is not allowed.

Second Embodiment

Next, a second embodiment will be described.

In the first embodiment, when it is determined that a predetermined termination suspension time has elapsed after measurement of time is started, a remote desktop connection is terminated. This termination suspension time may be extended by performing a particular operation on the mobile terminal device 40.

An access control method according to the second embodiment will be described below with reference to FIG. 12 and FIG. 13. Also in the second embodiment, the system 1 illustrated in FIG. 1 may be used. Hereinafter, the same components as those in the first embodiment will be labeled with the same reference numerals, and the description thereof will be omitted.

Figure 12:
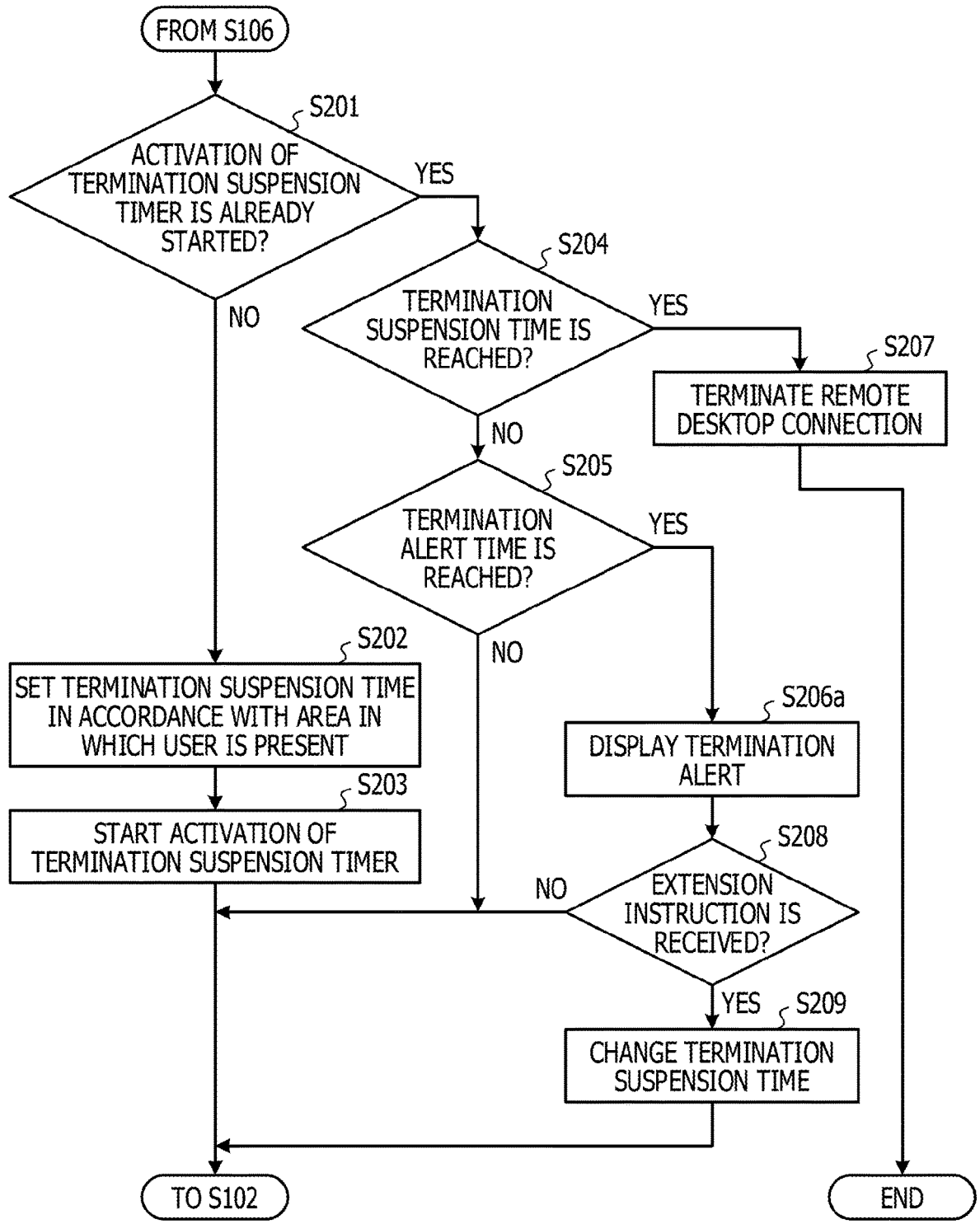
FIG. 12 is a flowchart illustrating an example of a process performed by an information processing device according to a second embodiment.

FIG. 12 is a flowchart illustrating an example of the process performed by the information processing device in the second embodiment. In the second embodiment, the process from steps S101 to S109 illustrated in FIG. 3 and the process from steps S201 to S205 or S207 via step S204 illustrated in FIG. 8 are performed in the same manner as those in the first embodiment.

As illustrated in FIG. 12, if it is determined by the determination unit 14 in step S205 that the termination alert time is not reached (S205: No), the process returns to step S102 of FIG. 3 and re-performs the process from step S102. On the other hand, if it is determined by the determination unit 14 in step S205 that the termination alert time is reached (S205: Yes), the session management unit 13 causes the display unit 31 of the client device 30 to display a termination alert including a message that suggests an extension procedure (S206a).

Figure 13:
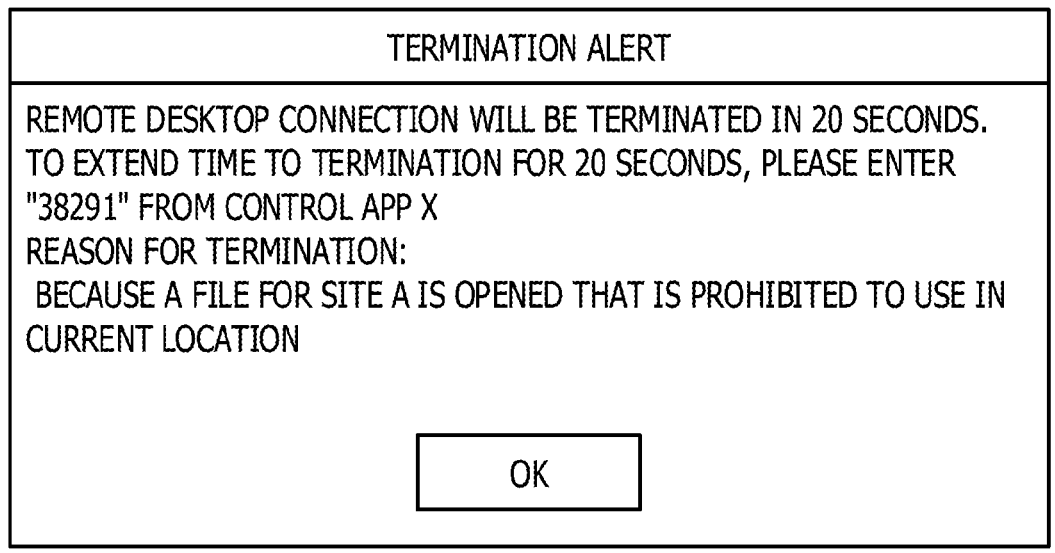
FIG. 13 is a diagram illustrating an example of a termination alert according to the second embodiment.

FIG. 13 is a diagram illustrating an example of a termination alert in the second embodiment. In the example of FIG. 13, the termination alert includes the following message that urges the user to perform a particular operation for extending the termination suspension time: "Remote desktop connection will be terminated in 20 seconds. To extend time to termination for 20 seconds, please enter "38291" from control app X." In this example, the character string of "38291" is a one-time password, for example. In addition to the above message, the termination alert also includes the following message to explain a reason for termination of a remote desktop connection: "Because a file for site A is opened that is prohibited to use at current location."

When the user who views the displayed termination alert performs a particular operation on the mobile terminal device 40, the mobile terminal device 40 transmits, to the information processing device 10, an extension request for requesting an extension of the termination suspension time.

Turning back to FIG. 12, after step S206a, the determination unit 14 determines whether or not an extension instruction is received from the mobile terminal device 40 (S208). If it is determined that an extension instruction is received (S208: Yes), the time setting unit 19 changes the set termination suspension time in response to the extension instruction (S209). After the process of step S209, the process returns to step S102 of FIG. 3 and re-performs the process from step S102. On the other hand, if it is determined that no extension instruction is received within a predetermined time after the termination alert has been displayed (S208: No), the process returns to step S102 of FIG. 3 without changing the set termination suspension time and re-performs the process from step S102.

As described above, the process performed by the information processing device 10 is implemented.

According to the second embodiment, when the termination alert time is reached, a termination alert including a message that suggests an extension procedure is displayed on the display unit of the client device, and when an extension instruction transmitted through a particular operation from a mobile terminal device, the termination suspension time is changed. According to this method, since the user has to perform a particular operation that takes time for the user in extending the termination suspension time, a long time use of an out-of-area resource in an area in which access is not allowed may be avoided.

Third Embodiment

Next, a third embodiment will be described. In the first modified example of the first embodiment, the termination suspended time is set shorter for a larger number of times of reconnection. In the second modified example of the first embodiment, however, the setting of the termination suspension time is dynamically changed in accordance with the number of out-of-area resources used at the same time by using a remote desktop connection. In contrast, the third embodiment is featured in that the termination suspension time is set in accordance with the likelihood of the user being present in a predetermined area and the frequency of user operations.

The third embodiment will be described below in detail with reference to FIG. 14 to FIG. 17. The same components as those of the first embodiment are labeled with the same reference numerals, and the description thereof will be omitted.

Figure 14:
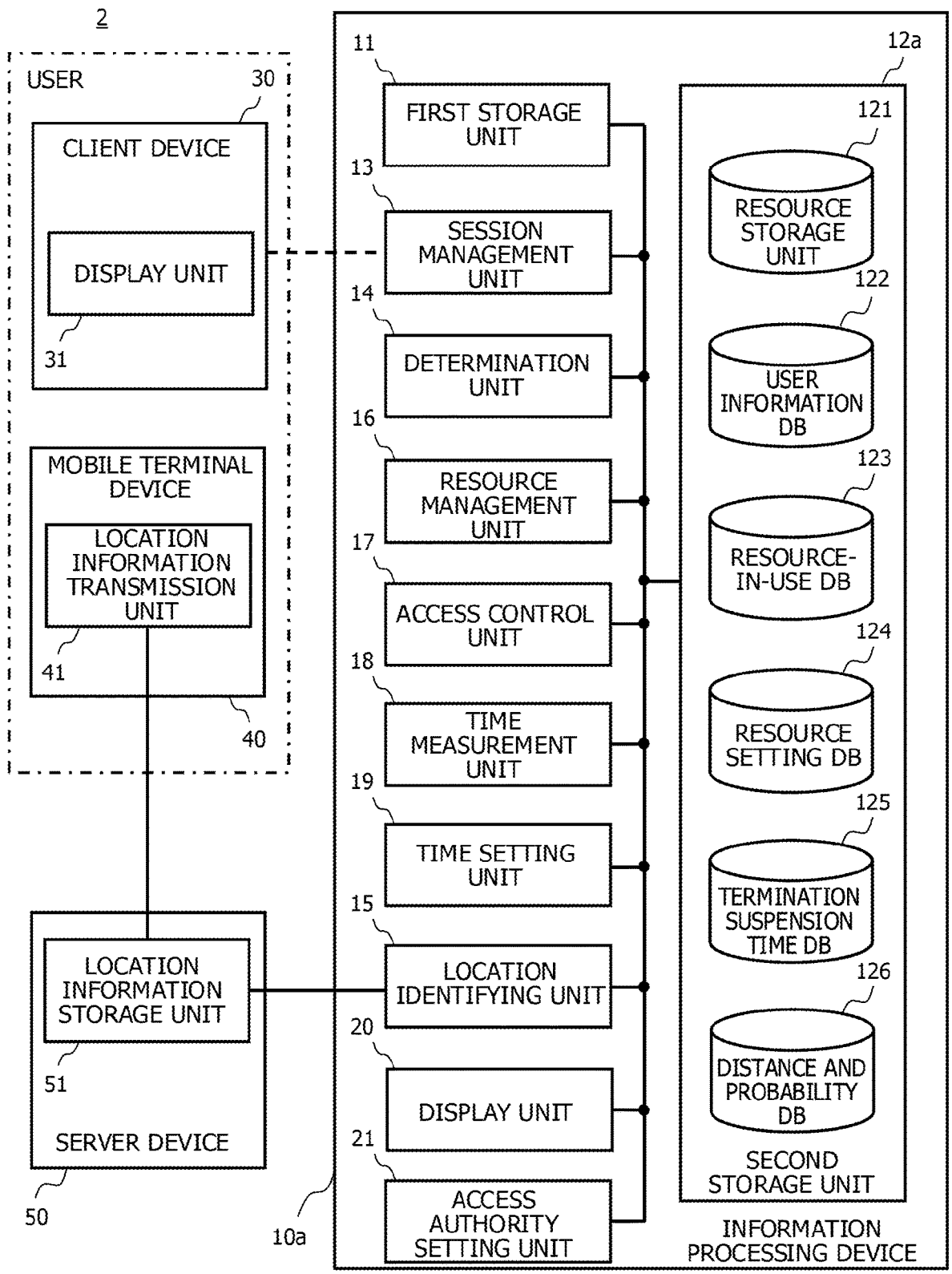
FIG. 14 is a diagram illustrating a system according to a third embodiment.

FIG. 14 is a diagram illustrating an example of a system in the third embodiment. As illustrated in FIG. 14, a system 2 includes an information processing device 10a, the client device 30, the mobile terminal device 40, and the server device 50. The information processing device 10a may mutually communicate with the client device 30 and the server device 50 via a network.

The information processing device 10a is different from the information processing device 10 in that a second storage unit 12a has a distance and probability DB 126. The distance and probability DB 126 stores probability information in which a distance from an area and a probability of the user being present in the area are associated with each other for each of the plurality of areas. The specific example of the distance and probability DB 126 will be described later.

Next, an access control method performed by the information processing device 10a illustrated in FIG. 14 in the third embodiment will be described.

Figure 15:
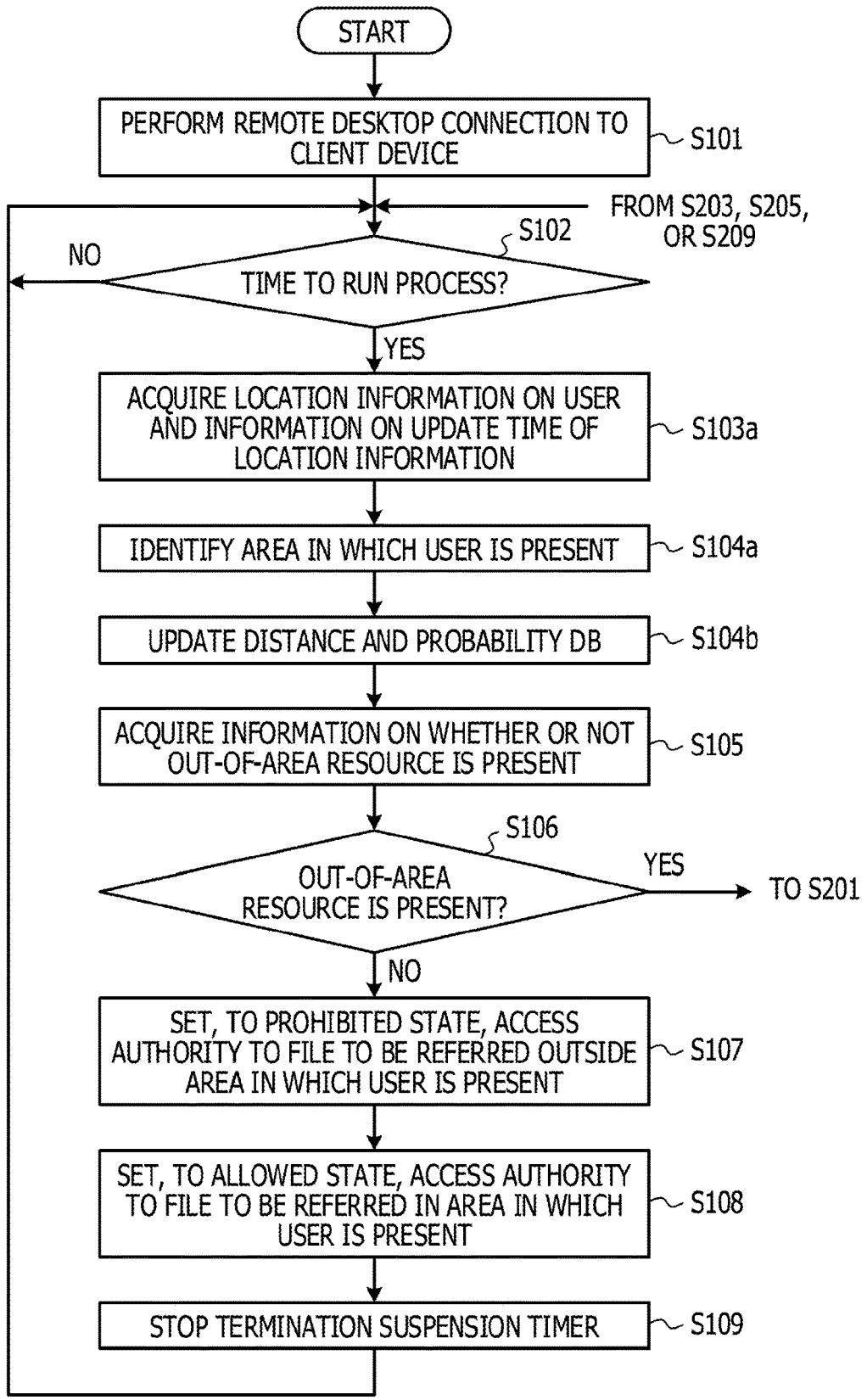
FIG. 15 is a flowchart (part 1) illustrating an example of a process performed by an information processing device according to the third embodiment.

FIG. 15 is a flowchart (part 1) illustrating an example of a process performed by the information processing device 10a of the third embodiment. Since the process of steps S101 and S102 is the same as the process of steps S101 and S102 in the first embodiment illustrated in FIG. 3, the description thereof will be omitted.

If it is determined to be the time to run the process (S102: Yes), in step S103a, the location identifying unit 15 acquires location information on the user and information on update time of the location information (S103a). Also in the third embodiment, the mobile terminal device 40 is set so as to periodically transmit location information on the mobile terminal device 40 to the server device 50. Since transmission of location information is stopped when the mobile terminal device 40 enters a sleep state, however, reception intervals of location information may not be the same on the server device 50 side. Thus, in the third embodiment, the server device 50 stores location information and the received time thereof in association with each other in the location information storage unit 51 every time when location information is received from the mobile terminal device 40. The time when location information is received corresponds to the update time of the location information described above.

In step S103a, first, the location identifying unit 15 transmits, to the server device 50, a transmission request for location information on the mobile terminal device 40 and update time of the location information. In response to the received transmission request, the server device 50 transmits location information on the mobile terminal device 40 and information on update time to the information processing device 10a. This enables the location identifying unit 15 to acquire location information on the user carrying the mobile terminal device 40 and information on update time.

Subsequently, the location identifying unit 15 identifies an area in which the user is present (S104a). Since the process of step S104a is the same as the process of step S104 in the first embodiment illustrated in FIG. 3, the description thereof will be omitted.

Subsequently, the time setting unit 19 updates the distance and probability DB 126 (S104b). An example of the distance and probability DB 126 will be described.

FIG. 16 is a diagram illustrating an example of the distance and probability DB 126. As illustrated in FIG. 16, the distance and probability DB 126 has fields of area, distance from area, and probability. In the field of area, information indicating an area is stored. In the field of distance from area, information indicating a distance from an allowed region is stored. In the field of probability, information on a probability indicating an index indicative of a probability of the user being present in a certain area is stored. The maximum value of the probability is set for an allowed region. A smaller value of the probability is set for a longer distance from an allowed region. Alternatively, a smaller value of the probability is set for a longer elapsed time from update time of location information. The example of FIG. 16 indicates that the allowed region is "site 1", the distance from an area corresponding to "site 1" is "0", and the probability is "1". The example of FIG. 16 indicates that the distance from an area corresponding to "site 2" that is distant from "site 1" is "12" and the probability is "0.1".

Turning back to FIG. 15, in step S104a, the time setting unit 19 updates the distance and probability DB 126 in accordance with location information on the user and information on update time of the location information acquired in step S103a. After the process of step S104b, the process proceeds to step S105. Since the process of steps S105 to S109 is the same as the process of steps S105 to S109 illustrated in FIG. 3, the description thereof will be omitted.

Figure 17:
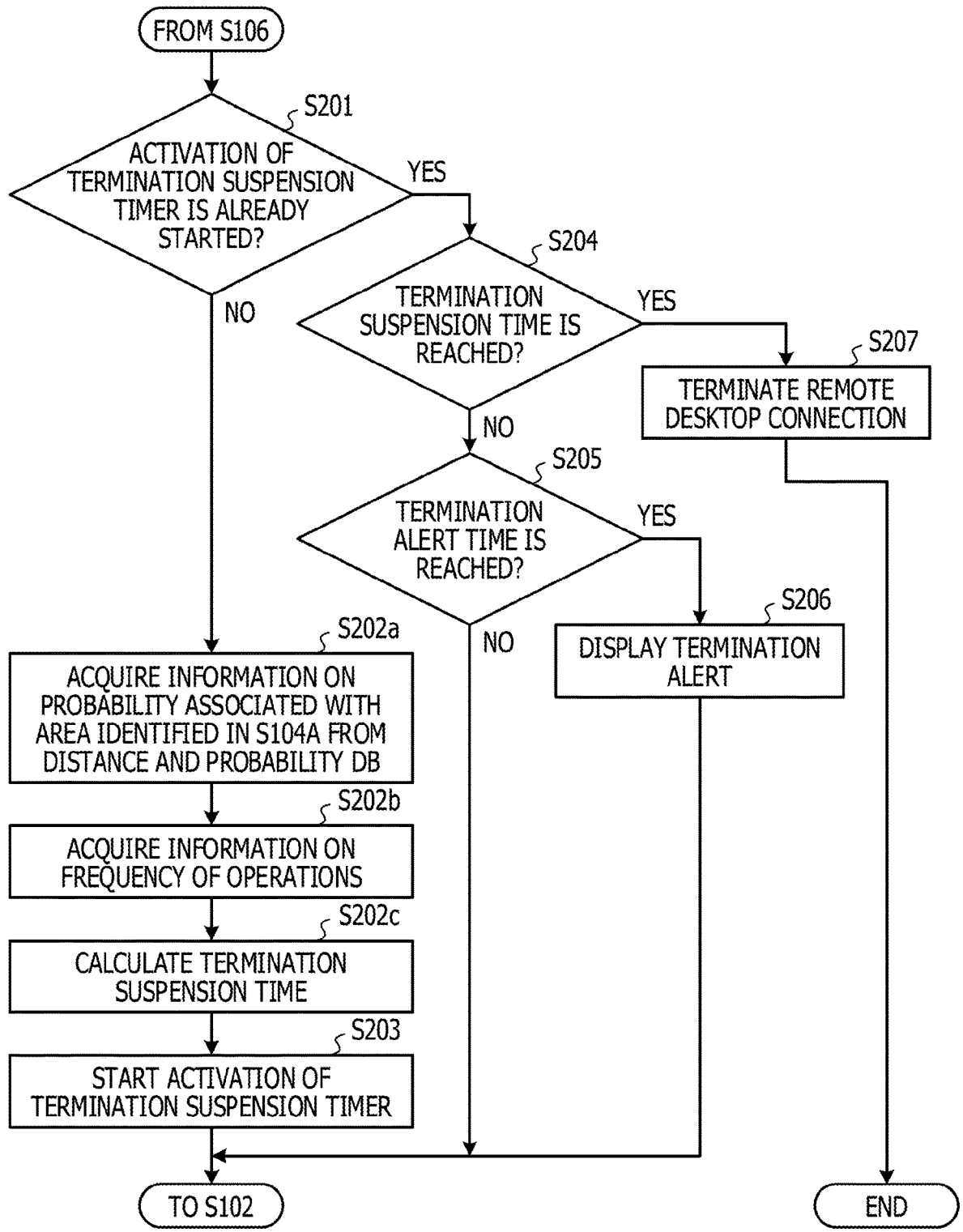
FIG. 17 is a flowchart (part 2) illustrating an example of a process performed by the information processing device according to the third embodiment.

FIG. 17 is a flowchart (part 2) illustrating an example of the process performed by the information processing device 10a in the third embodiment.

If it is determined in step S106 illustrated in FIG. 15 that an out-of-area resource is present (S106: Yes), the determination unit 14 determines whether or not activation of the termination suspension timer is already started (S201). If it is determined that activation of the termination suspension timer is not yet started (S201: No), the time setting unit 19 acquires information on a probability associated with an area identified in step S104a from the distance and probability DB 126 (S202a).

Subsequently, the time setting unit 19 acquires information on a frequency of operations to the information processing device 10a (S202b). In step S202b, the time setting unit 19 acquires information on a frequency of operations by counting the number of times per unit time for which the client device 30 uses remote desktop connection to perform entry operations on the information processing device 10a.

Subsequently, the time setting unit 19 calculates a termination suspension time in accordance with the probability value acquired in step S202a, the frequency of operations acquired in step S202b, and a setting value of termination suspension time acquired from the termination suspension time DB 125 (S202c). In step S202c, the time setting unit 19 calculates termination suspension time n by using the following Equation (1).

$$n=k*d*p*t \qquad \text{Equation (1)}$$

In Equation (1), k denotes a constant, d denotes a probability value acquired in step S202a, p denotes a frequency of operations acquired in step S202b, and t denotes a setting value of termination suspension time. The value t may be acquired from the termination suspension time DB 125 by extracting a setting value associated with an area in which the user is present. The calculated termination suspension time n is then set in the termination suspension timer.

After the process of step S202c, the time measurement unit 18 starts activating the termination suspension timer to start time measurement (S203). After the process of step S203, the process returns to step S102 of FIG. 15 and re-performs the process from step S102.

On the other hand, if it is determined in step S201 that activation of the termination suspension timer is already started (S201: Yes), the process proceeds to step S204. Since the process from step S204 is the same as the process from step S204 illustrated in FIG. 8, the description thereof will be omitted.

As described above, the process performed by the information processing device 10a is implemented.

According to the third embodiment, the termination suspension time of a remote desktop connection is set in accordance with a probability and a frequency of operations. With this method, since the user is able to set a longer termination suspension time for a shorter moving distance from an allowed region, usability of remote desktop connection may be improved, and operating time of the information processing device 10a may be optimized.

While the preferred embodiments have been described above, the embodiment is not limited to a particular embodiment, but various modifications or alterations are possible.

For example, while the example in which a termination alert is displayed for 20 seconds before a remote desktop connection is terminated is illustrated in FIG. 10, a termination alert may be displayed at the same time as activation of the termination suspension timer. According to this method, the user who is using a file is able to immediately recognize that the user has moved out of an area in which the use of the file is allowed. Further, the time during which the file is referred to may be reduced in an area in which the use of the file is prohibited.

Each processing unit of the information processing device 10 described above may be implemented as software realizing a VDI system or software externally added to application software (Excel or the like) used for utilizing a resource. This enables the function of the disclosure to be easily implemented without changing existing software realizing a VDI system or existing application software used for utilizing a resource.

A computer program that causes a computer to realize the mobile terminal device and the control method described above and a non-transitory computer readable storage medium in which the program is stored are included in the scope of the embodiment. The non-transitory computer readable storage medium may be a memory card such as an SD card, for example. The computer program is not limited to that stored in the storage medium but may be transmitted via a telecommunication line, a wired or wireless communication line, a network represented by the Internet, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory and configured to:
   identify, from a plurality of locations, a first location where a user is present,
   when the user accesses a resource by using a remote desktop connection, set access authority of the user over the resource to an allowed state or a prohibited state in accordance with whether or not the location is within an allowed region in which access to the resource is allowed,
   judge whether the first location is different from a second location in which the user subsequently is present and accesses the resource by using information in which each of the plurality of locations and the resource accessed by the user are associated with each other,
   when it is determined that the first location, which is an allowed region, is different from the second location, which is not an allowed region, while the user is accessing the resource by using the remote desktop connection, start measurement of time without setting the access authority of the user over the resource to the prohibited state, and
   when it is determined that a suspension time period which is associated with the first location has elapsed after the measurement is started by referring to a data base including a plurality of suspension time periods for each of the plurality of the locations, terminate the remote desktop connection, wherein
   the suspension time period is dynamically changed in accordance with a number of out-of-area resources used at the same time by using the remote desktop.

2. The information processing device according to claim 1, wherein the processor is configured to:
   set the access authority to the allowed state or the prohibited state in accordance with a combination of the location and time when the location is identified, and
   when it is determined that the user is accessing a resource to which access using the remote desktop connection is not allowed at the location at the time, start the measurement of time.

3. The information processing device according to claim 1, wherein the processor is configured to
   when it is determined that a termination alert time is reached before the predetermined time has elapsed, display a termination alert for providing a warning of termination of the remote desktop connection.

4. The information processing device according to claim 3, wherein
   the termination alert includes a message that provide a suggestion for an extension procedure, and
   the processor is configured to, when an extension instruction transmitted from a mobile terminal device carried by the user is received in response to the message, change the predetermined time.

5. The information processing device according to claim 1,
   wherein the processor is configured to identify the location by receiving the location information from a server device that acquires location information at predetermined time intervals from the mobile terminal device carried by the user.

6. The information processing device according to claim 1,
   wherein the processor is configured to, when the number of times of reconnection of the remote desktop connection reaches an upper limit, disable the reconnection.

7. The information processing device according to claim 1,
   wherein the processor is configured to set the suspension time in accordance with an elapsed time from termination to reconnection of the remote desktop connection.

8. An information processing method executed by a processor included in an information processing device, the information processing method comprising:
   identifying, from a plurality of locations, a first location where a user is present;
   when the user accesses a resource by using a remote desktop connection, setting access authority of the user over the resource to an allowed state or a prohibited state in accordance with whether or not the location is within an allowed region in which access to the resource is allowed,
   judging whether the first location is different from a second location in which the user subsequently is present and accesses the resource by using information in which each of the plurality of locations and the resource accessed by the user are associated with each other, when it is determined that the first location, which is an allowed region, is different from the second location, which is not an allowed region, while the user is accessing the resource by using the remote desktop connection, starting measurement of time without setting the access authority of the user over the resource to a prohibited state, and when it is determined that a suspension time period which is associated with the first location has elapsed after the measurement is started by referring to a database including a plurality of suspension time periods for each of the plurality of the locations, terminating the remote desktop connection, wherein the suspension time period is dynamically changed in accordance with a number of out-of-area resources used at the same time by using the remote desktop.

9. The information processing method according to claim 8, wherein the setting includes setting the access authority to the allowed state or the prohibited state in accordance with a combination of the location and time when the location is identified, and the information processing method further comprising
when it is determined that the user is accessing a resource to which access using the remote desktop connection is not allowed at the location at the time, starting the measurement of time.

10. A non-transitory computer-readable storage medium storing a program that causes a computer to execute a process, the process comprising:

identifying, from a plurality of locations, a first location where a user is present;

when the user accesses a resource by using a remote desktop connection, setting access authority of the user over the resource to an allowed state or a prohibited state in accordance with whether or not the location is within an allowed region in which access to the resource is allowed, judging whether the first location is different from a second location in which the user subsequently is present and accesses the resource by using information in which each of the plurality of locations and the resource accessed by the user are associated with each other, when it is determined that the first location, which is an allowed region, is different from the second location, which is not an allowed region, while the user is accessing the resource by using the remote desktop connection, starting measurement of time without setting the access authority of the user over the resource to a prohibited state, and when it is determined that a suspension time period which is associated with the first location has elapsed after the measurement is started by referring to a database including a plurality of suspension time periods for each of the plurality of the locations, terminating the remote desktop connection, wherein the suspension time period is dynamically changed in accordance with a number of out-of-area resources used at the same time by using the remote desktop.

* * * * *